United States Patent
Morein

(10) Patent No.: US 6,744,432 B1
(45) Date of Patent: Jun. 1, 2004

(54) METHOD AND APPARATUS FOR DETERMINING A REPRESENTATIVE Z VALUES IN A VIDEO GRAPHICS SYSTEM

(75) Inventor: Stephen L. Morein, Cambridge, MA (US)

(73) Assignee: ATI International Srl, Barbados (KN)

( * ) Notice: Subject to any disclaimer, the term of this patent is extended or adjusted under 35 U.S.C. 154(b) by 0 days.

(21) Appl. No.: 09/527,754

(22) Filed: Mar. 17, 2000

(51) Int. Cl.$^7$ ................................. G06T 15/40

(52) U.S. Cl. ........................ 345/422; 345/545

(58) Field of Search ................... 345/503, 509, 345/422, 545, 856, 531, 501, 419; 340/709, 146.2, 825.62; 700/5; 341/101; 712/214

(56) References Cited

U.S. PATENT DOCUMENTS

| | | | |
|---|---|---|---|
| 5,146,211 A | * | 9/1992 | Adams et al. ............ 345/856 |
| 5,933,156 A | * | 8/1999 | Margolin .................. 345/545 |
| 6,115,047 A | * | 9/2000 | Deering ................... 345/422 |
| 6,172,678 B1 | * | 1/2001 | Shiraishi .................. 345/422 |
| 6,327,508 B1 | * | 12/2001 | Mergard .................. 700/5 |
| 6,359,624 B1 | * | 3/2002 | Kunimatsu ............... 345/503 |

* cited by examiner

Primary Examiner—Matthew C. Bella
Assistant Examiner—Dalip Singh
(74) Attorney, Agent, or Firm—Vedder, Price, Kaufman & Kammholz, P.C.

(57) ABSTRACT

A method and apparatus for determining a rear most Z value for a pixel block is presented, where the pixel block is a portion of the image data for a frame as stored in a frame buffer. The frame buffer is stored in a DRAM memory structure that is included on an integrated circuit along with a render backend block that blends received fragments from a three-dimensional (3D) video graphics pipeline with the image data stored in the frame buffer. The 3D video graphics pipeline is located on a video graphics processing integrated circuit separate from the integrated circuit storing the frame buffer and render backend block. The integrated circuit storing the frame buffer includes a value determination block that determines the rear most Z value. The value determination block includes a data serialization block that serializes the bits corresponding to the Z values for the pixels included in the pixel block to produce a plurality of corresponding serial bit streams. A comparison tree is coupled to the data serialization block, and the comparison tree sorts through all of the serial bit streams corresponding to the Z values for the pixel block to determine the bit stream corresponding to the rear most Z value included in the pixel block. This resultant bit stream can then be converted to a parallel format and provided to the 3D video graphics pipeline for use in comparison operations to determine if certain primitives, or portions thereof, should be fully processed.

23 Claims, 5 Drawing Sheets

| Input | | | | | Output | | |
|---|---|---|---|---|---|---|---|
| Input A | Input B | Reset | Set Register | Choice Register | Output | Set Register | Choice Register |
| 0 | 0 | 1 | X | X | 0 | 0 | X |
| 0 | 1 | 1 | X | X | 1 | 1 | 1 |
| 1 | 0 | 1 | X | X | 1 | 1 | 0 |
| 1 | 1 | 1 | X | X | 1 | 0 | X |
| 0 | 0 | 0 | 0 | X | 0 | 0 | X |
| 0 | 1 | 0 | 0 | X | 1 | 1 | 1 |
| 1 | 0 | 0 | 0 | X | 1 | 1 | 0 |
| 1 | 1 | 0 | 0 | X | 1 | 0 | X |
| 0 | 0 | 0 | 1 | 0 | 0 | 1 | 0 |
| 0 | 1 | 0 | 1 | 0 | 0 | 1 | 0 |
| 1 | 0 | 0 | 1 | 0 | 1 | 1 | 0 |
| 1 | 1 | 0 | 1 | 0 | 1 | 1 | 0 |
| 0 | 0 | 0 | 1 | 1 | 0 | 1 | 1 |
| 0 | 1 | 0 | 1 | 1 | 1 | 1 | 1 |
| 1 | 0 | 0 | 1 | 1 | 0 | 1 | 1 |
| 1 | 1 | 0 | 1 | 1 | 1 | 1 | 1 |

METHOD AND APPARATUS FOR DETERMINING A REPRESENTATIVE Z VALUES IN A VIDEO GRAPHICS SYSTEM

FIELD OF THE INVENTION

The invention relates generally to video graphics processing and more particularly to a method and apparatus for determining a representative Z values in a video graphics system.

BACKGROUND OF THE INVENTION

Computers are used in many applications. As computers continue to evolve, the display requirements for computers become more complex and more demanding. In many cases, one of the limiting factors in the speed with which video graphics images can be displayed and updated is related to the speed with which the memory storing the current display frame can be accessed by the render backend block, which updates the images in the frame. Because video graphics primitives generated by the computer system are continuously provided for rendering, which includes blending video graphics primitives with image data currently stored for a particular display frame in a frame buffer, any memory access speed limitations between the render backend block and the frame buffer can have significant adverse effects on overall display system performance.

Because the memory used to store the image data for the frame may be relatively large in terms of die area required on an integrated circuit, the memory maybe constructed as an individual integrated circuit that is coupled to another integrated circuit that includes the video graphics rendering circuitry. This is done to reduce system costs. The interface between these integrated circuits may not be capable of operating at the same speeds that would be possible if the memory structure and the render backend block were included on the same integrated circuit. One solution is to include the render backend block portion of the video graphics processing circuitry on the same integrated circuit as the frame buffer. This can increase the speed with which the render backend block is able to access the frame buffer. Although the pixel fragment data must be relayed from the video graphics processing integrated circuit to that which includes the frame buffer and render backend block over an inter-chip interface, only one transfer is required across this interface per fragment. Because the render backend, block may perform multiple memory accesses in order to incorporate the information included in a pixel fragment into the image data stored in the frame buffer, the efficiency gained by including the render backend block on the same integrated circuit as the frame buffer can be substantial.

However, including the render backend block on the same integrated circuit as the frame buffer can be detrimental to other optimizations designed for reducing the processing requirements for rendering certain data graphics primitives. Including additional circuitry on the integrated circuit that includes the render backend block and the frame buffer can be expensive and complicated as the memory structures used for storing the frame buffer are commonly dynamic random access memory (DRAM) memory structures, and the processes used to manufacture such memory structures make the inclusion of additional circuitry and interconnect expensive. Therefore, any additional circuitry added for supporting optimizations included in other portions of the video graphics pipeline should be implemented using a minimal amount of circuitry and interconnect.

One optimization that can be used in order to reduce the processing operations required for rendering video graphics primitives is to determine representative Z values (where Z represents a depth coordinate in three-dimensional space) for the primitives and comparing these representative Z values with one or more representative Z values for the portions of the image data in the frame buffer. Such comparisons can then be used to determine whether or not certain primitives to be rendered will be visible if they are rendered, thus enabling non-visible primitives to be discarded. As such, a circuit for determining representative Z values for different portions of the frame buffer is desirable. In prior art solutions, this may have been accomplished using complex circuitry included in the render backend block or associated circuitry. Such complex circuitry is not practical if the render backend block is implemented on the same integrated circuit as the frame buffer when the process used to manufacture such an integrated circuit is the type of process associated with manufacturing DRAM memory circuits.

Therefore, a need exists for a method and apparatus for determining representative Z values for various portions of the image data stored in a frame buffer using a limited amount of circuitry and interconnect.

BRIEF DESCRIPTION OF THE DRAWINGS

FIG. 4 illustrates a state table that may describe the functionality of the comparison block in FIG. 3.

DETAILED DESCRIPTION OF THE PREFERRED EMBODIMENT OF THE INVENTION

Figure 1:
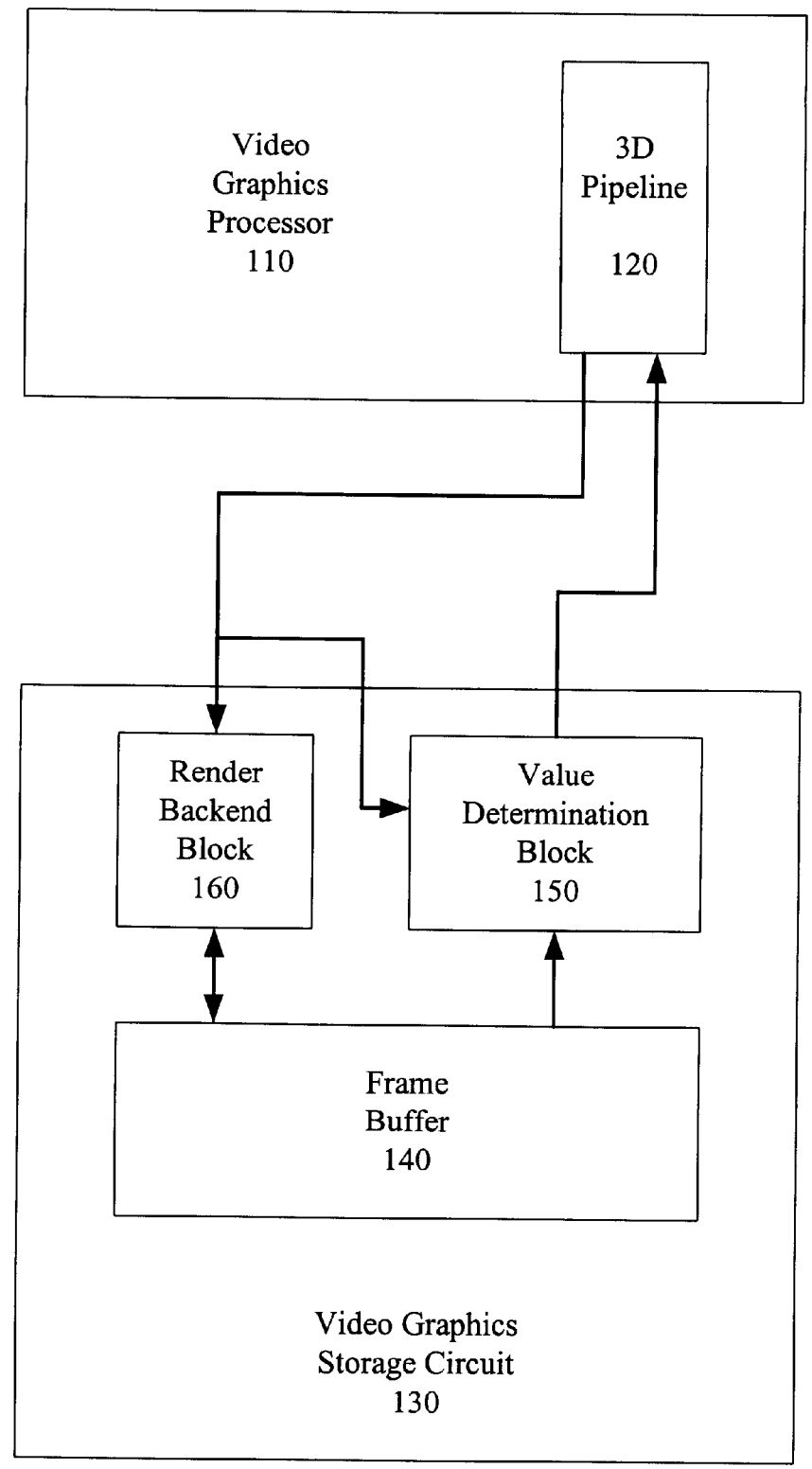
FIG. 1 illustrates a block diagram of a video graphics system in accordance with a particular embodiment of the present invention.

Generally, the present invention provides a method and apparatus for determining a rear most Z value for a pixel block, where the pixel block is a portion of the image data for a frame as stored in a frame buffer. The frame buffer may be stored in a DRAM memory structure that is included on an integrated circuit along with a render backend block that blends received fragments from a three-dimensional (3D) video graphics pipeline with the image data stored in the frame buffer. The 3D video graphics pipeline is preferably located on a video graphics processing integrated circuit separate from the integrated circuit storing the frame buffer and render backend block. The integrated circuit storing the frame buffer includes a value determination block that determines the rear most Z value. The value determination block includes a data serialization block that serializes the bits corresponding to the Z values for the pixels included in the pixel block to produce a plurality of corresponding serial bit streams. A comparison tree is coupled to the data serialization block, and the comparison tree sorts through all of the serial bit streams corresponding to the Z values for the pixel block to determine the bit stream corresponding to the rear most Z value included in the pixel block. This resultant bit stream can then be converted to a parallel format and provided to the 3D video graphics pipeline for use in comparison operations to determine if certain primitives, or portions thereof, should be fully processed.

By including the render backend block on the same integrated circuit as the frame buffer, the speed with which the frame buffer can be accessed by the render backend block is significantly increased. The inclusion of a value determination block that is capable of determining the rear most Z value for pixel blocks within the frame buffer allows the rear most Z value for the pixel blocks to be communicated back to the 3D pipeline. The 3D pipeline can then utilize these rear most Z values to make rough determinations as to whether certain primitives, or portions thereof, will be visible if rendered. Those primitives, or portions thereof, which are determined to lie behind the image data already rendered in the frame buffer are discarded rather than being rendered as they would have no effect on the image data currently stored in the frame buffer. As such, overall video graphics processing efficiency is increased.

The technique for reducing the processing requirements for rendering video graphics primitives by discarding primitives, or portions thereof, based on Z value comparisons is detailed in two co-pending United States patent applications. Both of these co-pending patent applications are assigned to the same assignee as the present application, and also include a common inventor. The first co-pending application is entitled "METHOD AND APPARATUS FOR PROCESSING PORTIONS OF PRIMITIVES THAT ARE BEING RENDERED" and has a Ser. No. of 09/457,648 and a filing data of Dec. $9^{th}$, 1999. The second co-pending application is entitled "METHOD AND APPARATUS FOR PROCESSING OBJECT ELEMENTS THAT ARE BEING RENDERED" and has a Ser. No. of 09/140,930 and was filed on Aug. $26^{th}$, 1998. These co-pending applications describe in detail the techniques used for reducing the required processing operations for the rendering of video graphics primitives through elimination of primitives that not visible due to their positioning behind image data already present in the frame buffer.

In order to eliminate primitives, or portions thereof, from the set of primitives that must be rendered, the front most Z value of the primitive, or a portion thereof, is compared with the rear most Z value associated with a particular portion of the image data stored in the frame buffer that corresponds to the coordinates of the primitive or primitive portion. If the front most portion of the primitive to be rendered, (as indicated by the front most Z value) lies behind the rear most portion of the image data to which the primitive corresponds (as indicated by the rear most Z value), no portion of the primitive would be visible, and the primitive can be discarded. If the comparison determines that the front most portion of the primitive lies in front of a rear most portion of the image data in the frame buffer, the rendering operations associated with that primitive, or various portions of that primitive, will be performed.

The invention can be better understood with reference to FIGS. 1–5. FIG. 1 illustrates a block diagram of a video graphics circuit 100 that includes a video graphics processor 110 and a video graphics data storage circuit 130. Preferably, each of the video graphics processor 110 and the video graphics data storage circuit 130 are implemented as discrete integrated circuits. These integrated circuits may be included in a video graphics expansion card that is used in association with a personal computer to improve or supplement the video graphics capabilities of the personal computer.

The video graphics processor 110 is shown to include a 3D pipeline 120. The 3dimensional pipeline is used to render video graphics images for display. Rendering of the video graphics images by the 3D pipeline 120 may include determining if portions of various video graphics primitives require further processing based on their relative positioning with respect to other image data currently stored for the display. Thus, as stated above, if portions of the video graphics primitives are determined to lie behind image data already present, further processing is not required as the portions of the primitives will not affect the image data currently stored. Such a determination can be made by comparing a representative Z value corresponding to the video graphics data stored in a frame buffer 140 (rear most Z values) with representative Z values corresponding to the various portions of the video graphics primitives (front most Z values).

The comparison between the representative Z values may be performed on a primitive-by-primitive basis such that an entire primitive may be eliminated from further processing based on a single comparison, or through a more granulated comparison. The more granulated comparison may include separating various primitives into a number of primitive portions where a representative Z value is determined for each portion. The representative Z value for the portion is then compared with a representative Z value for a corresponding pixel block of the video graphics data currently stored in the frame buffer to determine whether or not further processing of the portion of the primitive is required. The video graphics data storage circuit 130 is shown to include a render backend block 160, the frame buffer 140, and a value determination block 150. The render backend block 160 receives pixel fragments from the 3D pipeline 120 and blends the pixel fragments with the image data currently stored in the frame buffer 140. Such blending operations are well understood in the art. By including the render backend block 160 on the same integrated circuit as the frame buffer 140, the speed with which the frame buffer 140 can be accessed by the render backend block 160 is greatly increased in comparison to the case where the two blocks are on separate integrated circuits.

The video graphics data storage circuit 130 is preferably based on a DRAM memory integrated circuit as DRAM memory is very cost-effective for storing large amounts of data. As such, the processing operations performed in order to manufacture the video graphics data storage circuit 130 may be particular to DRAM memory manufacturing. As such, complex circuitry included within the video graphics data storage circuit 130 can be more costly to implement than would typically be the case in a standard process methodology. As such, the additional circuitry included on the video graphics data storage circuit 130 for operations such as determining representative Z values should be minimized.

The value determination block 150 determines the representative Z values corresponding to the video graphics data stored in the frame buffer. The video graphics data storage circuit 150 then provides the representative Z values corresponding to the video graphics data stored in the frame buffer to the video graphics processor 110. These representative Z values 152 can then be used to make determinations as to whether or not further processing of certain primitives, or portions thereof, is warranted. The values that are presented to the value determination block 150 are preferably selected by a portion of the 3D pipeline 120 such that the representative Z values returned to the 3D pipeline 120 are understood to correspond to a particular portion (pixel block) of the image data stored in the frame buffer 140. Because the frame buffer 140 is preferably implemented as a DRAM memory circuit, the value determination block 150 may simply be coupled to an output portion of the DRAM circuit such that a memory read operation supplies the data for evaluation to the value determination block 150. By arranging the data corresponding to various pixel blocks for which representative Z values are desired in the DRAM in a predetermined fashion, the presentation of the values for the entire pixel block to the value determination block 150 can be achieved in an efficient manner.

Presentation of the Z values for a pixel block to the value determination block 150 can be accomplished by storing all of the values for an entire pixel block in a particular row within the DRAM structure that stores the frame buffer 140. The number of pixels in a pixel block may vary based on the size of a row such that if a row is known to include 8,192 bits, and each pixel requires 64 bits of storage, each row would include 128 pixels, thus defining the size of the pixel blocks for which representative Z values are calculated. It should be noted that the structure of DRAM memories can vary, and multiple bank DRAM structures could also be utilized by including circuitry which selects from which of the banks the particular data values to be evaluated are sourced.

Figure 2:
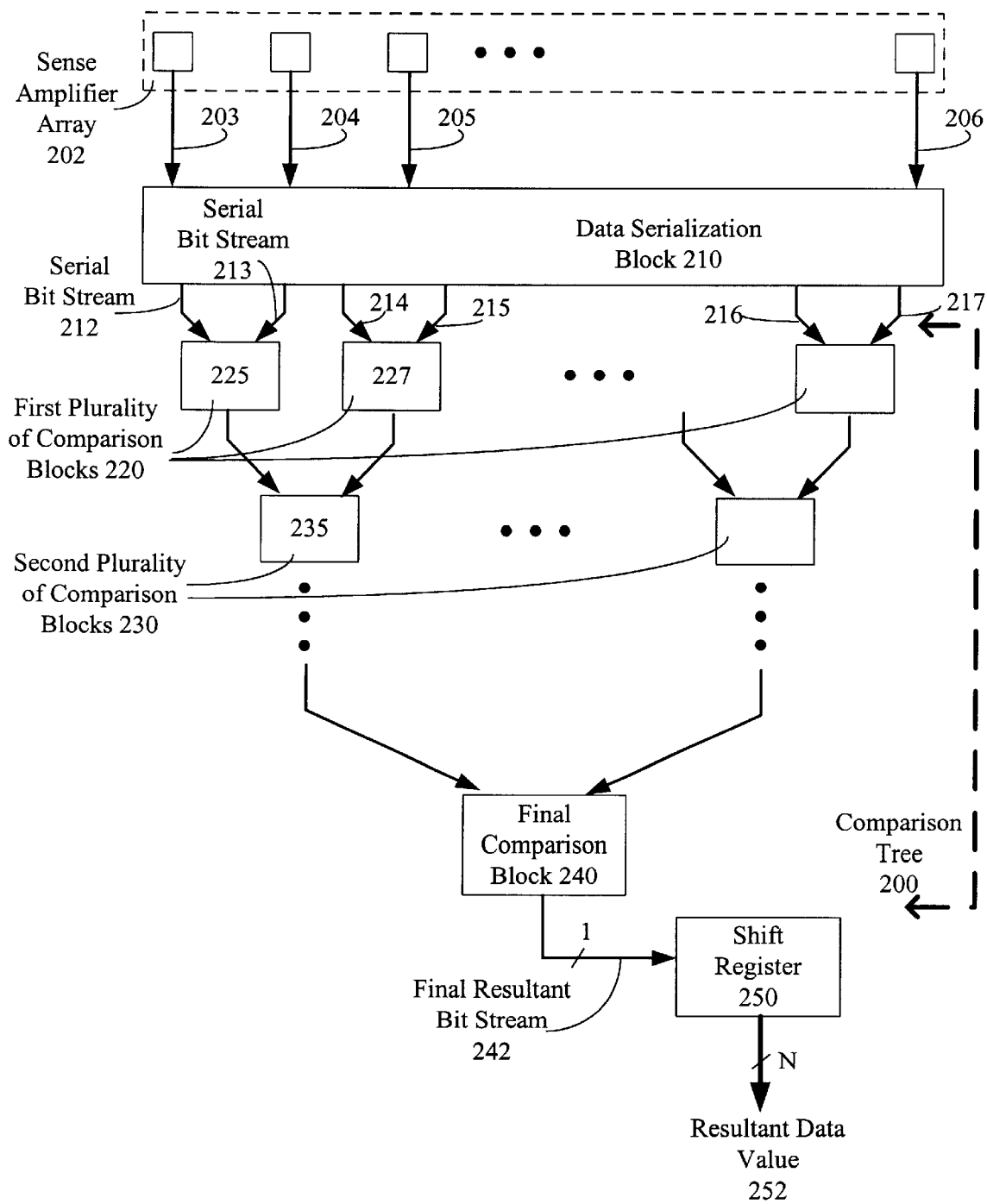
FIG. 2 illustrates a block diagram of a value determination block in accordance with a particular embodiment of the present invention.

FIG. 2 illustrates a block diagram of a particular embodiment of the value determination block 150 of FIG. 1. The circuit illustrated in FIG. 2 includes a portion (the sense amplifier array 202) of the memory structure that stores the data values to be evaluated. In one embodiment, these data values may represent Z values associated with a plurality of pixels that are included in a particular pixel block for which a representative Z value is desired. The representative Z value may be the rear most Z value, which may be determined by the Z value that is the largest, or, in other embodiments, by the Z value that is the smallest. As is apparent to one of ordinary skill in the art, depending on the orientation of the Z-axis, the largest or the smallest Z value will represent the rear most Z value. Although the embodiments described herein are generally associated with determining the largest Z value, the alterations to the example circuits described herein in order to determine the smallest Z value are straightforward and therefore apparent to one of ordinary skill in the art.

The sense amplifier array 202 is an output portion of the memory structure that stores the data values. The memory structure, which may be a DRAM memory structure or similar data array, may include a plurality of rows of data values. The data array output the data values in a selected row of the plurality of rows in response to row selection data, which may be received from the 3D pipeline. The sense., amplifier array 202 includes a plurality of sense amplifiers 203–206 where each sense amplifier provides a particular bit of a particular data value included in the set of data values to be evaluated. Thus, the sense amplifier array 202 may include the sense amplifiers corresponding to a DRAM, where the sense amplifier array 202 represents an entire row of the DRAM memory structure, or a row of a particular bank within such a DRAM memory structure. Although each of the sense amplifiers 203–206 presents a single bit of a data value to be evaluated, the data values are presented to the value determination block in their entirety in a parallel fashion. In order to minimize the circuitry required to perform the comparison operations on the values to be evaluated, each of the values received by the value determination block is serialized by the data serialization block 210.

Thus, the data serialization block 210 will receive a plurality of bit's corresponding to a plurality of values in the selected row of the data array. For each value included in the plurality of values, the data serialization block will organize the bits for that value in a predetermined order for further processing. The result is a plurality of serial bit streams 212–217. Each serial bit stream produced by the data serialization block 210 includes a sequence of bits that represent a particular value included in the set of values to be evaluated.

The plurality of serial bit streams 212–217 is provided to a comparison tree 200. The comparison tree 200 includes a plurality of comparison blocks that are intercoupled to form the comparison tree 200. The intercoupling of the comparison blocks is in a tree-like manner, where the "leaves" of the tree are the comparison blocks that are coupled to the data serialization block 210, and the "root" of the tree is a final comparison block 240. Note that only portions of most hierarchical levels within the tree have been illustrated for the sake of simplification of the drawing.

As is illustrated, the first plurality of comparison blocks 220, which is coupled to the data serialization block 210, includes a larger number of comparison blocks than the second plurality of comparison blocks 230, which includes half as many. Thus, two comparison blocks in the first plurality of comparison blocks 220 feed a single comparison block in the second plurality of comparison blocks 230. This continues until all of the branches of the tree converge at the final comparison block 240 In a simplified example comparison tree that receives 16 values to be evaluated, the first plurality of comparison blocks would include eight comparison blocks. The second plurality of comparison blocks would include four comparison blocks, a third plurality would include two, and the two comparison blocks in the third level would feed the final comparison block 240.

Each comparison block receives at least two input serial bit streams and produces a resultant bit stream based on a value comparison between the at least two input serial bit streams that it receives. Although the embodiments described herein include two inputs per comparison block, it should be apparent to one of ordinary skill in the art that each comparison block could be designed to receive more than two input bit streams. In the example illustrated in FIG. 2, the comparison block 225, which is included in the first plurality of comparison blocks 220, receives the serial bit streams 212 and 213. The comparison block 225 selects one of these two bit streams as a resultant bit stream 222 which is then forwarded to a comparison block included in the second plurality of comparison blocks 230. Similarly, the comparison block 227 receives the serial bit streams 214 and 215 and selects one of those two bit streams as its resultant bit stream. The resultant bit streams from the comparison blocks 225 and 227 are provided to the comparison block 235 of the second plurality of comparison blocks 230. The comparison block 235 selects from the resultant bit streams that it receives from the comparison blocks 225 and 227 to generate its own resultant bit stream that it passes on to a subsequent comparison block.

The bit stream that is selected by each of the comparison blocks is preferably the bit stream corresponding to the data value that is the larger of the two data values for which its input bit streams correspond. Thus, if the comparison block 225 determines that the serial bit stream 212 corresponds to a data value that is larger than the value to which the serial bit stream 213 corresponds, the comparison block 225 outputs the serial bit stream 212 as its resultant bit stream. Note that the comparison and output is performed on a bit-by-bit basis, and an overall comparison of the two input values only results from a plurality of bit comparisons. As stated earlier, each comparison block may determine the bit stream representing a smaller data value in other embodiments. Additional detail as to the operations of the data serialization block 210 and a particular comparison block is provided with respect to FIGS. 3 and 4 below.

The final comparison block 240 included in the comparison tree 200 determines a final resultant bit stream 242 that represents a resultant data value, which may be the representative Z value for a plurality of pixels. The final resultant bit stream 242 is in a serial format, and a shift register 250 may be included in the circuit of FIG. 2 such that the final resultant bit stream 242 is converted to a resultant data value 252 which is in a parallel format. The shift register 250 receives the final resultant bit stream 342 and produces a resultant plurality of bits that makes up the resultant data value 252. In the case where the resultant data value 252 is a representative Z value for a pixel block, this value can then be communicated back to the 3D pipeline for use in rendering operations.

Thus, the resultant data value 252 represents a selected one of the plurality of data values provided to the comparison tree 200 as a plurality of serial bit streams, where the selection is based on a value comparison amongst the data values. By performing the comparison on a bit-by-bit basis in a serial manner, the circuitry required to perform the comparison is substantially simpler than that which would be required to perform the value comparison in a parallel manner. For example, if all of the bits in a plurality of 32-bit values were compared in parallel, significantly more circuitry than that required to perform the serial comparison would be needed. As described earlier, large amounts of complex circuitry is undesirable due to the limitations of the DRAM process methodology.

Figure 3:
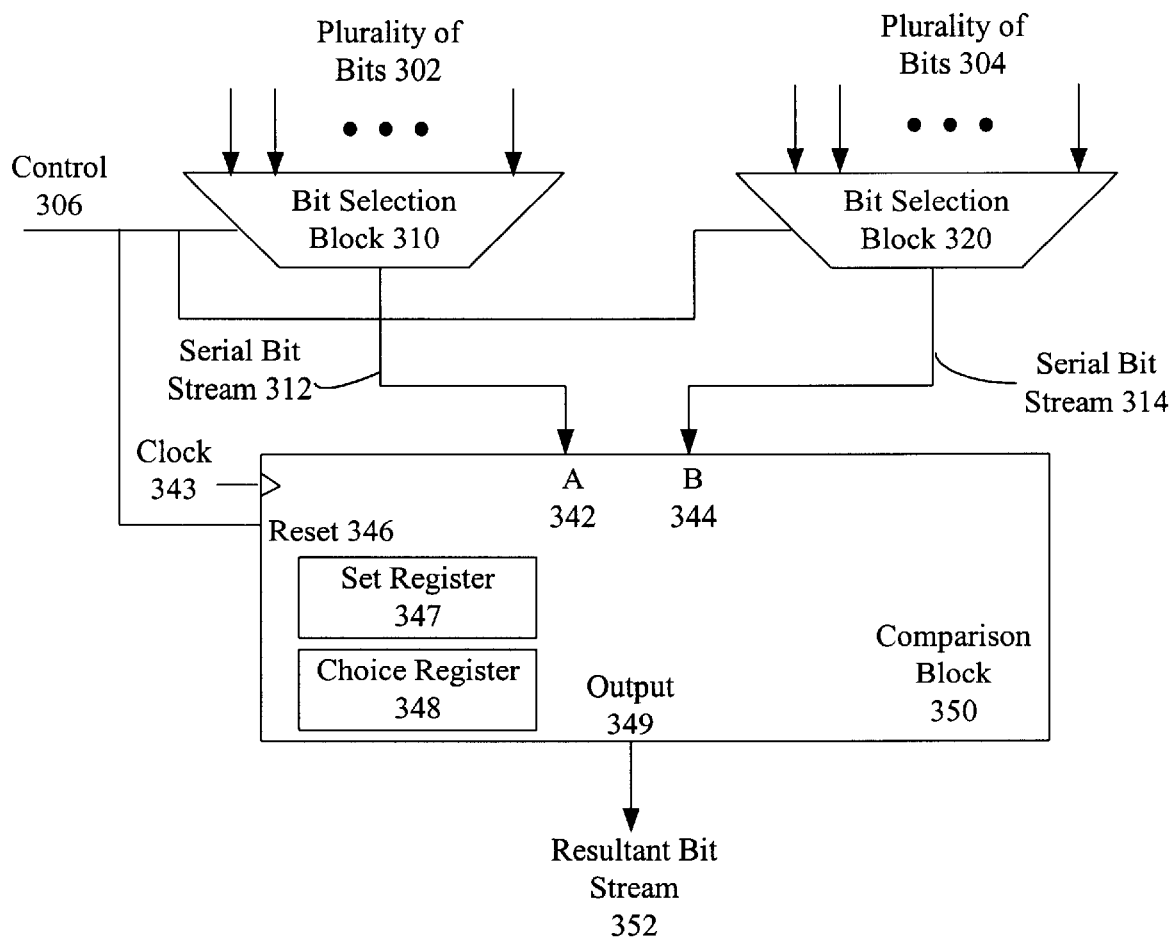
FIG. 3 illustrates a block diagram of portions of the value determination block of FIG. 2 in additional detail in accordance with a particular embodiment of the present invention.

FIG. 3 illustrates a more detailed view of a portion of a value determination block 300. The portion illustrated includes a first and second bit selection block 310 and 320, and a comparison block 350. The first bit selection block 310 receives a plurality of bits 302 that represents a first value. The bit selection block 310 generates a serial bit stream 312 from the plurality of bits 302 based on one or more control signals 306. The one or more control signals 306 may be generated by a state machine or similar control apparatus.

Preferably, the one or more control signals 306 provided to the bit selection block 310 cause the bit selection block 310, which may be a multiplexer, to generate the serial bit stream 312 from the plurality of bits 302 by ordering the bits according to their significance. Thus, the first bit within the serial bit stream 312 generated from the plurality of bits 302 is preferably the most significant bit with respect to the determination of the value that the plurality of bits 302 represents.

Similarly, the bit selection block 320 generates a serial bit stream 314 from the plurality of bits 304 that it receives. The serial bit stream 314 is preferably generated in the same manner as the serial bit stream 312 such that the most significant bit is the first bit included in the serial bit stream 314.

The comparison block 350 includes an input A 342, and input B 344, a reset input 346, and an output 349. The comparison block 350 also includes a set register 347 and a choice register 348, where the set and choice registers 347 and 348 may be single bit registers implemented by flip-flops or similar devices. Operation of the comparison block is based on the clock signal 343, which synchronizes operations of the comparison block 350 and controls state changes within the comparison block 350. The behavior of the comparison block 350 is detailed in the state table 400 illustrated in FIG. 4.

The output portion of the state table 400 of FIG. 4 indicates the value of the output signal 349 and the subsequent state of the set and choice registers 347 and 348 following a change of state as triggered by assertion of the clock signal. The subsequent state values are based on the previous state of the input A and B signals 342 and 344, the reset signal 346, and the previous state values of the set and choice registers 347 and 348. The specifics are detailed in the state table 400 of FIG. 4.

The general operation of the comparison block 350 is to choose one or the other of the serial bit streams 312 and 314 based on the bits that have been received thus far. Thus, the resultant bit stream 352 presented at the output 349 as generated by a sequence of comparison operations will be one of the serial bit streams 312 and 314.

Assuming that the state machine, or other circuitry which issues the control signals 306 asserts the reset signal 346 to correspond with the selection of the most significant bit for inclusion in each of the serial bit streams 312 and 314, the comparison block 350 will initiate a value comparison between the values represented by each of the plurality of bits 302 and 304. As is shown by the state table, assertion of the reset signal renders the previous state of the set and choice registers as don't cares ("X"'s) such that either a value of one or zero will produce the same result. If one of the inputs A or B 342 and 344 is a logic one, while the other is a logic zero, it is apparent that the value whose most significant bit is a logic value one will be larger than the other value, whose most significant bit is a logic zero. As such, the choice as to which of the serial bit streams 312 and 314 is made. Therefore, the choice register 348 is set to correspond to which of the inputs A or B 342 and 344 corresponds to that selected bit stream. The set register 347 is also configured to a set state, thus indicating that a choice has been made. For each subsequent clock, the bit value provided by the selected serial bit stream is simply relayed to the output 349.

If both of the input values A and B 342 and 344 are initially the same, no choice can be made, and the set register 347 remains in the cleared state. Because both of the input values A and B 342 and 344 are the same, it can be determined that the bit value to be included in the resultant bit stream 352 must be that value which is shared by both of the serial bit streams 312 and 314. This is because regardless of which of the bit streams is eventually selected, the value for this particular bit will be the same. The determination as to which of the two serial bit streams will be selected is therefore deferred until one of the input values defers from the other.

It should be noted that the state table illustrated in FIG. 4 corresponds to a selection of the larger of the two values represented by the plurality of bits 302 and 304. In the case where the lesser of the two values is to be determined, the state table 400 would change to reflect the selection of a serial bit stream based on a more significant zero, or cleared bit location in the serial bit stream that represents the overall value.

The logic design of the comparison block 350 at the gate level can vary from one implementation to the next. The reduction of a state table such as that illustrated in FIG. 4 to the gates required to achieve the logic states corresponding to the state table is a straightforward operation to one skilled in the art and may be performed using logic synthesis tools that are commonly available. As such, the gate level design of the comparison block 350 is not described in detail herein.

Figure 5:
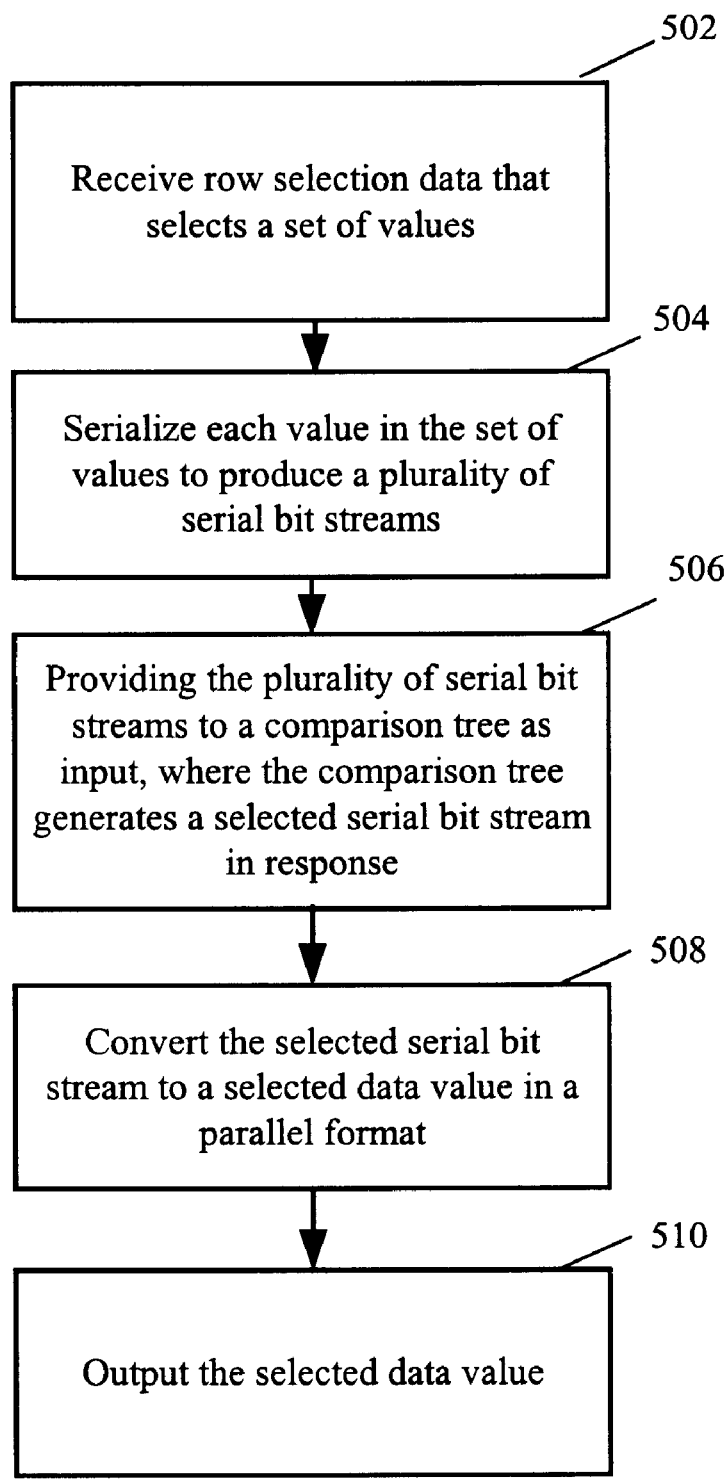
FIG. 5 illustrates a flow diagram of a method for determining a rear most Z value for a pixel block in accordance with a particular embodiment of the present invention.

FIG. 5 illustrates a flow diagram of a method for determining a rear most Z value for a pixel block. The method begins at step 502 where row selection data is received. The row selection data indicates the particular pixel block for which the rear most Z value is to be determined. Preferably, the Z values for the pixel block are stored in a frame buffer as part of a set of image data for a frame. The Z values for a particular pixel block are preferably stored in a single row of a data array, which may be a DRAM memory structure, such that the row selection data received at step 502 selects the Z values for a particular pixel block.

At step 504, each of the Z values, which may be read out as a parallel set of bits, is serialized to produce a plurality of serial bit streams. As described earlier, the serialization of the Z values is preferably performed in a manner such that the first bit in each serial bit stream corresponds to the most significant bit of the set of bits making up a particular value.

At step 506, the plurality of bit streams is provided as input to a comparison tree. The comparison tree is preferably structured as was illustrated in FIG. 2 such that the resulting serial bit stream produced by the comparison tree corresponds, one of the plurality of bit streams provided to the comparison tree, and represents a result of a value comparison amongst all of the values represented by the plurality of serial bit streams received by the comparison tree. This resulting selected serial bit stream may represent the bit stream corresponding to the largest value included in the set of values, or the smallest value included in the set of values, where the decision between largest and smallest depends on the orientation of the Z-axis. If the rear most Z value is represented by the largest Z value, the selected serial bit stream will correspond to that of the largest Z value provided to the comparison tree as input.

At step 508, the selected serial bit stream is converted to a selected data value in a parallel format. Note that the serial bit stream selected at step 506 may simply be provided to whatever circuitry is to utilize the rear most Z value in a serial format rather than performing the conversion to a parallel format at step 508. Assuming that the conversion to a parallel format is performed, the selected data value is outputted in response to the row selection data at step 510.

The method and apparatus described herein allow multi-bit data values to be compared in a serial format such that less circuitry and interconnect is required to perform the comparison. As such, the comparison circuitry can be implemented on integrated circuits manufactured by DRAM processing techniques without adding the cost and complexity that would be associated with more complex comparison blocks. As such, the comparison circuitry described herein can be implemented on an integrated circuit that stores the frame buffer for a video graphics processing circuit. In such an embodiment, the comparison circuitry can be used to determine representative Z values for pixel blocks in the frame buffer, where the representative Z values can then be used to simplify the rendering operations performed by overall video graphics system.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises, a list of elements does not include only those elements but may include other elements not expressly listed or inherent to such process, method, article, or apparatus.

What is claimed is:

1. A value determination block, comprising:
   a first bit selection block operably coupled to receive a first plurality of bits representing a first value, wherein the first bit selection block generates a first serial bit stream from the first plurality of bits, wherein the first bit selection block orders bits in the first serial bit stream according to their significance;
   a second bit selection block operably coupled to receive a second plurality of bits representing a second value, wherein the second bit selection block generates a second serial bit stream from the second plurality of bits, wherein the second bit selection block orders bits in the second serial bit stream according to their significance; and
   a comparison block operably coupled to the first and second bit selection blocks, wherein the comparison block receives the first and second serial bit streams and generates a resultant bit stream that is one of the first and second serial bit streams, wherein which of the first and second serial bit streams is used to generate the resultant bit stream is determined based on a value comparison between the first and second values.

2. The value determination block of claim 1, further comprising a shift register operably coupled to the comparison block, wherein the shift register loads the resultant bit stream and produces a resultant plurality of bits, wherein the resultant plurality of bits represents one of the first and second values.

3. The value determination block of claim 1, wherein the first and second bit selection blocks are multiplexers.

4. The value determination block of claim 1, wherein the first and second bit selection blocks are coupled to an array of sense amplifiers of a dynamic random access memory, wherein the array of sense amplifiers provides the first and second pluralities of bits.

5. The value determination block of claim 4, wherein each of the first and second values correspond to a Z value of a pixel in a block of image data.

6. The value determination block of claim 5, wherein the value determination block is included in an integrated circuit that further includes the dynamic random access memory.

7. The value determination block of claim 6, wherein the integrated circuit is included in a video graphics expansion card for use in a personal computer, wherein the video graphics expansion card includes a three-dimensional video graphics processor that is operably coupled to the value determination block.

8. A circuit comprising:
   a data array that stores a plurality of data values corresponding to a plurality of pixels, wherein the data array includes a plurality of rows of data values, wherein the data array outputs data values in a selected row of the plurality of rows in response to row selection data;

a value determination block operably coupled to the data array, wherein the value determination block receives the data values in the selected row and generates a resultant data value, wherein the resultant data value is based on a value comparison amongst the data values included in the selected row;

a data serialization block that serializes each of the data values in the selected row to produce a serial bit stream corresponding to each of the data values and orders bits in each serial bit stream according to their significance; and a comparison tree operably coupled to the data serialization block, wherein the comparison tree includes a plurality of comparison blocks intercoupled to form the comparison tree, wherein each of the comparison blocks receives at least two input serial bit streams and produces a resultant bit stream based on a value comparison between the at least two input serial bit streams, wherein a final comparison block included in the comparison tree determines a final resultant bit stream corresponding to the resultant data value.

9. The circuit of claim 8, wherein the value determination block further comprises a shift register operably coupled to the final comparison block of the comparison tree, wherein the shift register receives the final resultant bit stream and generates the resultant data value in a parallel format.

10. The circuit of claim 9, wherein the value determination block generates the resultant data value by selecting the largest data value received from the data array.

11. The circuit of claim 10, wherein each of the plurality of data values corresponds to a Z value for one of the plurality of pixels.

12. The circuit of claim 11, wherein the data array is stored in a dynamic random access memory structure.

13. The circuit of claim 12, wherein the circuit is implemented as an integrated circuit.

14. The circuit of claim 13, wherein the data serialization block includes a plurality of multiplexers.

15. The circuit of claim 14 further includes a state machine that produces control signals for the plurality of multiplexers and the plurality of comparison blocks in the comparison tree.

16. The circuit of claim 15, wherein each of the comparison blocks includes reset input that allows for initialization prior to each comparison operation.

17. The circuit of claim 9, wherein the value determination block generates the resultant data value by selecting the smallest data value received from the data array.

18. A video graphics system, comprising:

a video graphics processor that includes a three-dimensional pipeline, wherein the three-dimensional pipeline determines if portions of video graphics primitives require processing based on comparisons between representative Z values corresponding to video graphics data stored in a frame buffer and representative Z values corresponding to the portions of the video graphics primitives;

a video graphics data storage circuit operably coupled to the video graphics processor, wherein the video graphics data storage circuit stores the frame buffer, wherein the video graphics storage circuit includes a value determination block that determines the representative Z values corresponding to the video graphics data stored in the frame buffer, wherein the video graphics data storage circuit provides the representative Z values corresponding to the video graphics data stored in the frame buffer to the video graphics processor in response to data selection signals generated by the video graphics processor; and wherein the value determination block of the video graphics data storage circuit includes a serial comparison tree that compares Z values corresponding to pixels included in portions of the frame buffer in a serialized manner to determine the representative Z values corresponding to the video graphics data stored in the frame buffer wherein the Z values contain serialized bits ordered according to their significance.

19. The video graphics system of claim 18, wherein the video graphics processor and the video graphics storage circuit are each implemented as integrated circuits.

20. The video graphics system of claim 19, wherein the video graphics data storage circuit stores the frame buffer in a DRAM memory structure.

21. The video graphics system of claim 18, wherein a comparison block determines the largest Z value in a portion of the video graphics data stored in the frame buffer as the representative Z value corresponding to the portion of the video graphics data stored in the frame buffer.

22. A method for determining a rear-most Z value for a pixel block, comprising:

receiving row selection data from a graphics processor, wherein the row selection data selects a set of Z values stored in a memory structure for the pixel block;

serializing each value in the set of Z values to produce a plurality of serial bit streams;

ordering bits contained in the plurality of serial bit streams according to their significance;

providing the plurality of serial bit streams to a comparison tree as input, wherein the comparison tree outputs a selected serial bit stream of the plurality of bit streams based on a value comparison amongst values included in the set of values; and outputting the selected serial bit stream in response to the row selection data.

23. The method of claim 22 further comprises, wherein outputting the selected serial bit stream further comprises:

converting the selected serial bit stream to a selected data value in a parallel format; and outputting the selected data value in response to the row selection data.

* * * * *